United States Patent
Lee et al.

(10) Patent No.: US 11,214,146 B2
(45) Date of Patent: Jan. 4, 2022

(54) HEAD-UP DISPLAY APPARATUS FOR VEHICLE

(71) Applicant: LG Electronics Inc., Seoul (KR)

(72) Inventors: Jaeseung Lee, Seoul (KR); Yongsang Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/962,966

(22) PCT Filed: Jun. 1, 2018

(86) PCT No.: PCT/KR2018/006276
§ 371 (c)(1),
(2) Date: Jul. 17, 2020

(87) PCT Pub. No.: WO2019/142977
PCT Pub. Date: Jul. 25, 2019

(65) Prior Publication Data
US 2020/0338988 A1 Oct. 29, 2020

(30) Foreign Application Priority Data
Jan. 18, 2018 (KR) .......................... 10-2018-0006784

(51) Int. Cl.
*B60K 35/00* (2006.01)
*G02B 27/01* (2006.01)

(52) U.S. Cl.
CPC .............. *B60K 35/00* (2013.01); *G02B 27/01* (2013.01); *B60K 2370/1529* (2019.05); *B60K 2370/66* (2019.05); *G02B 2027/0154* (2013.01)

(58) Field of Classification Search
CPC ........... B60K 35/00; B60K 2370/1529; G02B 27/01; G02B 2027/0154; G02B 2027/0161; G02B 2027/0163
See application file for complete search history.

(56) References Cited

U.S. PATENT DOCUMENTS

| 9,989,761 | B2 * | 6/2018 | Yomogita | .............. F16M 11/10 |
| 10,310,263 | B2 * | 6/2019 | Nakayama | ............. B60K 35/00 |
| 2015/0146299 | A1 * | 5/2015 | Koseki | ............... G02B 27/0101 359/632 |
| 2017/0242257 | A1 * | 8/2017 | Tatekawa | ........... G02B 27/0101 |
| 2017/0315354 | A1 * | 11/2017 | Park | ....................... B60K 37/04 |
| 2017/0336633 | A1 * | 11/2017 | Yagi | .................... G02B 27/0101 |
| 2018/0157041 | A1 * | 6/2018 | Huang | ............... G02B 27/0006 |
| 2018/0201204 | A1 * | 7/2018 | Saitou | ................ G02B 27/0101 |
| 2018/0373034 | A1 * | 12/2018 | Saitou | .................... B60K 37/04 |

(Continued)

*Primary Examiner* — Christopher E Leiby
(74) *Attorney, Agent, or Firm* — Fish & Richardson P.C.

(57) ABSTRACT

Provided is a head-up display apparatus for a vehicle. The apparatus includes combiner assembly which includes a combiner exposed outside a dashboard or hidden inside the dashboard through a slot formed in the dashboard, a driver which provides a driving force to the combiner assembly, and a slot opening/closing device which opens or closes the slot by the driving force of the driver. The slot opening/closing device includes a door which opens or closes the slot, a lever-door link of which one end is connected to the door and which rotates about a first rotation axis, and a lever of which one end is connected to the lever-door link, which rotates about a second rotation axis, and to which the combiner assembly is slidably connected.

10 Claims, 18 Drawing Sheets

(56) References Cited

U.S. PATENT DOCUMENTS

2019/0033591 A1* 1/2019 Nakayama ......... G02B 27/0149
2019/0041640 A1* 2/2019 Hisatsugu ................. B60R 1/00
2019/0061638 A1* 2/2019 Hisatsugu .............. B60K 35/00
2019/0079289 A1* 3/2019 Saitou .................... B60K 35/00

* cited by examiner

HEAD-UP DISPLAY APPARATUS FOR VEHICLE

CROSS-REFERENCE TO RELATED APPLICATIONS

This application is a National Stage application under 35 U.S.C. § 371 of International Application No. PCT/KR2018/006276, filed on Jun. 1, 2018, which claims the benefit of Korean Application No. 10-2018-0006784, filed on Jan. 18, 2018. The disclosures of the prior applications are incorporated by reference in their entirety.

BACKGROUND OF THE INVENTION

Field of the Invention

The present disclosure relates to a head-up display apparatus for a vehicle.

Related Art

A vehicle is an apparatus which is moved in a direction desired by a user on board. A representative example of the vehicle is an automobile.

Meanwhile, for the convenience of a user using a vehicle, various types of sensors, electronic devices, and the like are provided in the vehicle. In particular, a research on an advanced driving unit assistance system (ADAS) has been actively conducted for a driving convenience of a user. In addition, a development of an autonomous vehicles has been actively conducted.

Recently, various display apparatuses are provided in a vehicle. A head up display is one of them. When the HUD is implemented according to an image projection method, a combiner may be utilized to reduce heterogeneity of a content felt by a user.

However, in a case where the combiner is fixedly installed on a dashboard, when the HUD is not used, a view of a driving person is obstructed. In addition, there is a problem that the combiner occupies a certain space inside the vehicle.

Therefore, a device which hides the combiner inside the dashboard when the HUD is not used and exposes the combiner to an outside only when the HUD is used has been developed.

Meanwhile, when the combiner is hidden or exposed, there is a problem that foreign substances on the dashboard enter the head-up display apparatus. Accordingly, and an improved type of vehicle display apparatus is required to solve this problem.

SUMMARY OF THE INVENTION

The present disclosure provides a head-up display apparatus in which a slit is opened or closed when a combiner is exposed to or hidden in a dashboard.

The object of the present disclosure are not limited to the above-mentioned object, and other objects not mentioned will be clearly understood by those skilled in the art from the following description.

In an aspect, a head-up display apparatus for a vehicle is provided. The apparatus includes a combiner assembly which includes a combiner exposed outside a dashboard or hidden inside the dashboard through a slot formed in the dashboard, a driver which provides a driving force to the combiner assembly, and a slot opening/closing device which opens or closes the slot by the driving force of the driver, in which the slot opening/closing device includes a door which opens or closes the slot, a lever-door link of which one end is connected to the door and which rotates about a first rotation axis, and a lever of which one end is connected to the lever-door link, which rotates about a second rotation axis, and to which the combiner assembly is slidably connected.

Specific details of other embodiments are included in the detailed description and the drawings.

According to the embodiments of the present disclosure, one or more of effects described below are provided.

First, the vertical movement of the combiner and the opening and closing of the slot are simultaneously performed using the driving force generated by one driver, and thus, it is possible to minimize power consumption.

Secondly, since the slot opening/closing device including a plurality of components rotating about different rotation axes is used, it is possible to effectively open or close the slot using a leverage effect.

Therefore, the above embodiments are to be construed in all aspects as illustrative and not restrictive. The scope of the present disclosure should be determined by the appended claims and their legal equivalents, not by the above description, and all changes coming within the meaning and equivalency range of the appended claims are intended to be embraced therein.

DESCRIPTION OF EXEMPLARY EMBODIMENTS

Figure 1:
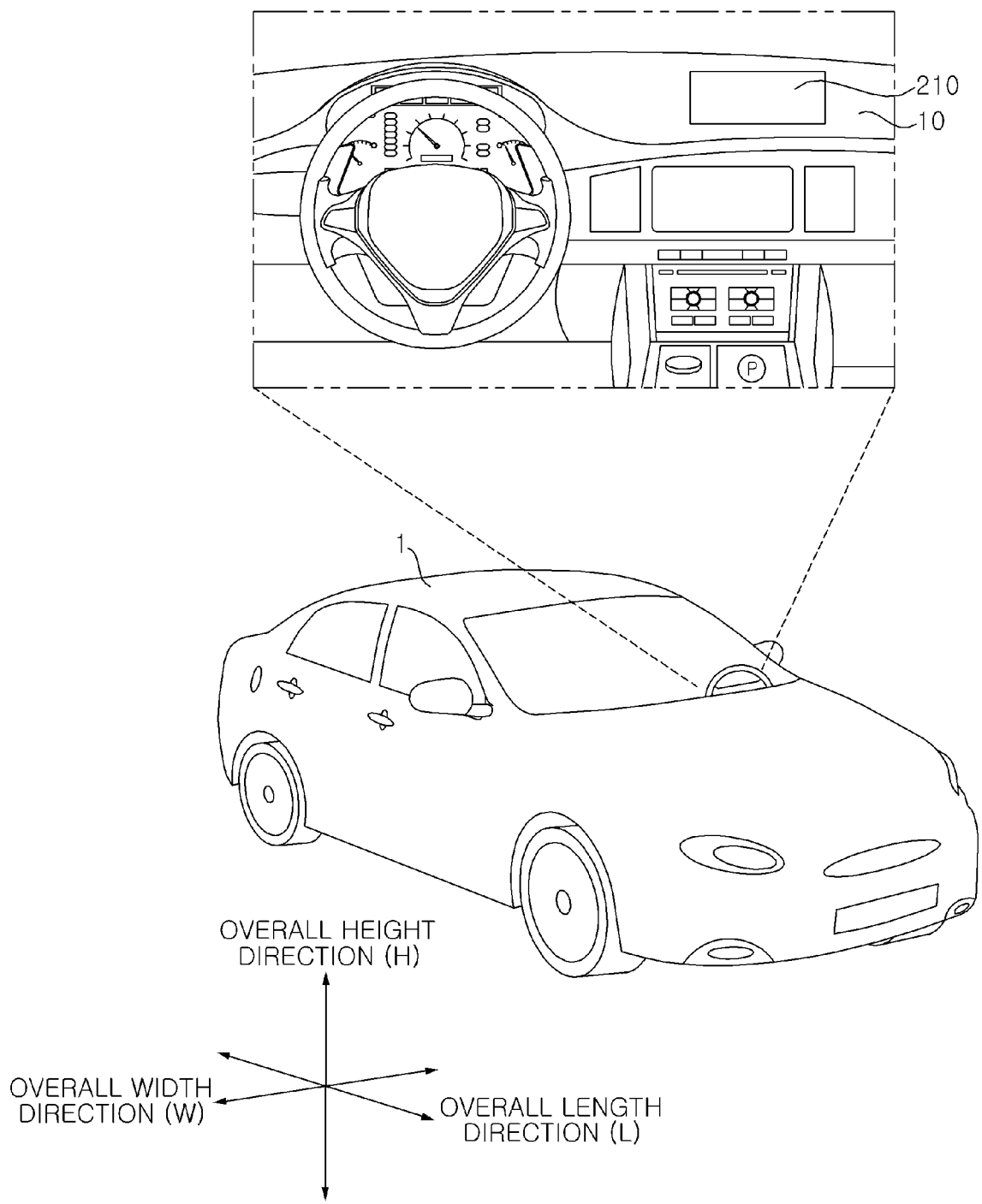
FIG. 1 is a view illustrating an appearance and a cockpit module of a vehicle according to an embodiment of the present disclosure.

Hereinafter, embodiments according to the present disclosure will be described in detail with reference to the attached drawings. The same reference numerals are assigned to the same or similar elements regardless of their reference numerals, and redundant descriptions thereof are omitted. In addition, it is to be noted that the suffixes of elements used in the following description, such as a "module" and a "unit", are assigned or interchangeable with each other by taking into consideration only the ease of writing this specification, but in themselves are not particularly given distinct meanings and roles. Further, in the following description, if a detailed description of known techniques associated with the present disclosure would unnecessarily obscure the gist of the present disclosure, detailed description thereof will be omitted. In addition, the attached drawings are provided for easy understanding of embodiments of the present disclosure and do not limit technical spirits of the disclosure, and the embodiments should be construed as including all modifications, equivalents, and alternatives falling within the spirit and scope of the present disclosure.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

An expression of the singular number may include an expression of the plural number unless clearly defined otherwise in the context.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

A vehicle described herein may include an automobile and a motorcycle. In the following description, an automobile is mainly described for a vehicle.

The vehicle described herein may include an internal combustion engine vehicle having an engine as a power source, a hybrid vehicle having an engine and an electric motor as a power source, and an electric vehicle having an electric motor as a power source.

In the following description, a left side of the vehicle means a left side in a driving direction of the vehicle, and a right side of the vehicle means a right side in the driving direction of the vehicle.

In the following description, a front may mean a forward driving direction of a vehicle 1, and a rear may mean a backward driving direction of the vehicle 1.

FIG. 1 is a view showing an appearance and a cockpit module of a vehicle according to an embodiment of the present disclosure.

Referring to FIG. 1, the vehicle 1 may include wheels which are rotated by a power source and a steering input device for adjusting a traveling direction of the vehicle 1.

According to an embodiment, the vehicle 1 may be an autonomous vehicle. In the case of the autonomous vehicle, a driving mode may be switched to an autonomous driving mode or a manual mode according to an input of a user. When the driving mode is switched to the manual mode, the autonomous vehicle 1 may receive a steering input through the steering input device.

The vehicle 1 may include an engine which supplies power based on a fossil fuel, an electric motor which supplies power using a DC power source such as a solar cell or a battery, or the like. In addition, the vehicle 1 may include a transmission for converting the power from the engine into a rotational force, a brake for stopping a progress of the vehicle, or the like.

The vehicle 1 may include a vehicle driving assistance apparatus. The vehicle driving assistance apparatus is a device which assists a driving person based on information obtained from various sensors. The vehicle driving assistance apparatus may be referred to as an advanced driving unit assistance system (ADAS).

The vehicle 1 may include a vehicle display apparatus which functions as an output device and an input device inside the vehicle 1. For example, the vehicle 1 may include a head-up display apparatus as a vehicle display apparatus.

A head-up display apparatus 100 may project an image to a front windshield or combiner (combiner) 210. The head-up display apparatus 100 may include an image output unit which generates an image and projects the image to the front windshield or the combiner 210.

For example, a slot may be formed in the dashboard 10. The combiner 210 may be hidden inside the slot or exposed to an outside. Here, the outside means an interior of the vehicle 1.

An overall length is a length from the front to the rear of the vehicle 1, an overall width is a width of the vehicle 1, and an overall height is a length from a bottom of the wheel to a roof. In the following description, an overall length direction (L) may means a direction which is a reference for measuring the overall length of the vehicle 1, an overall width direction (W) may means a direction which is a reference for measuring the overall width of the vehicle 1, and an overall height direction (H) may means a direction which is a reference for measuring the overall height of the vehicle 1.

In the following description, a right-left direction may mean the overall width direction. An up-down direction may mean the overall height direction. A front-rear direction may mean the overall length direction.

In the following description, a front (F), a rear (R), a left (Le), a right (Ri), an upper (U), a lower (D) may be defined as shown in the drawings. However, these are for convenience of description and may be defined differently.

Figure 2:
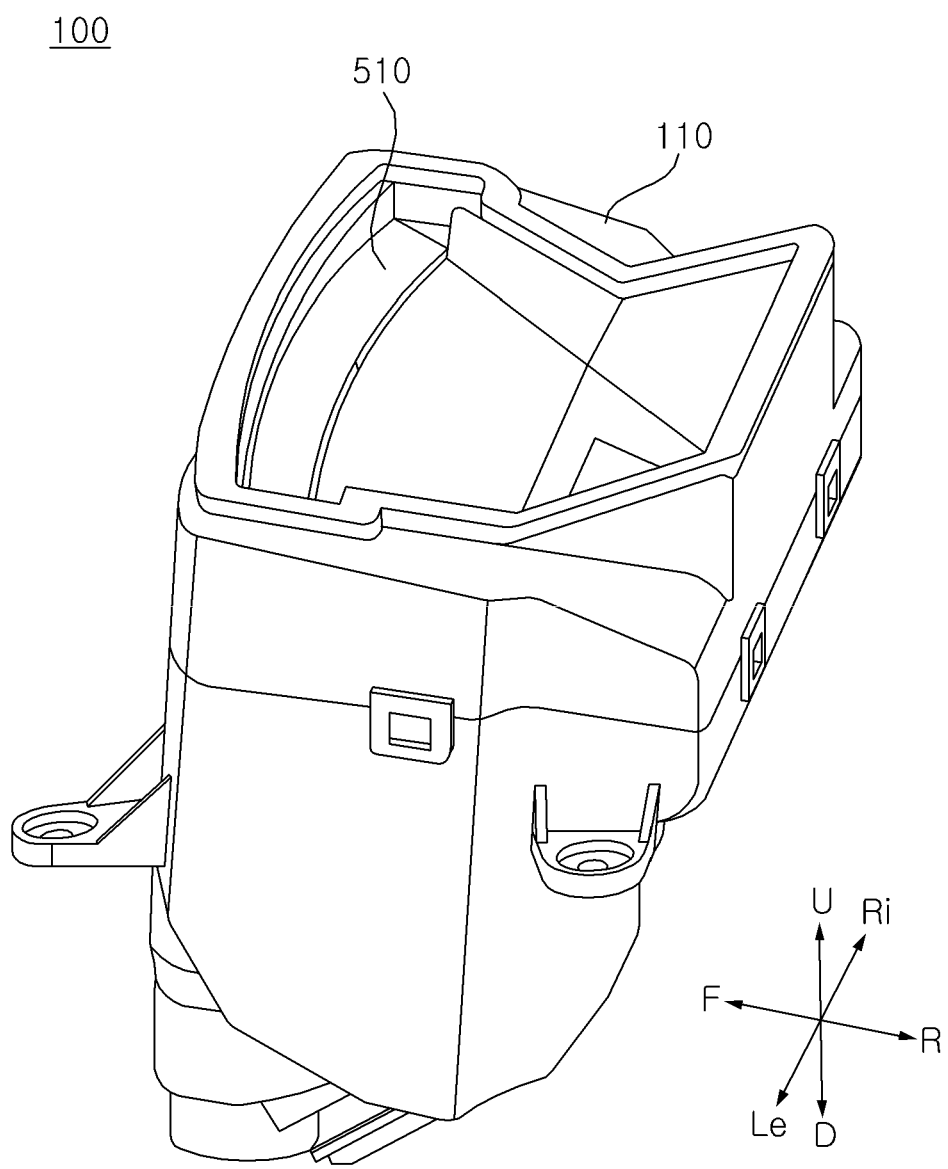
FIG. 2 is a view for explaining the appearance of a head-up display apparatus according to an embodiment of the present disclosure.

FIG. 2 is a view for explaining the appearance of a head-up display apparatus according to an embodiment of the present disclosure.

Figure 3A:
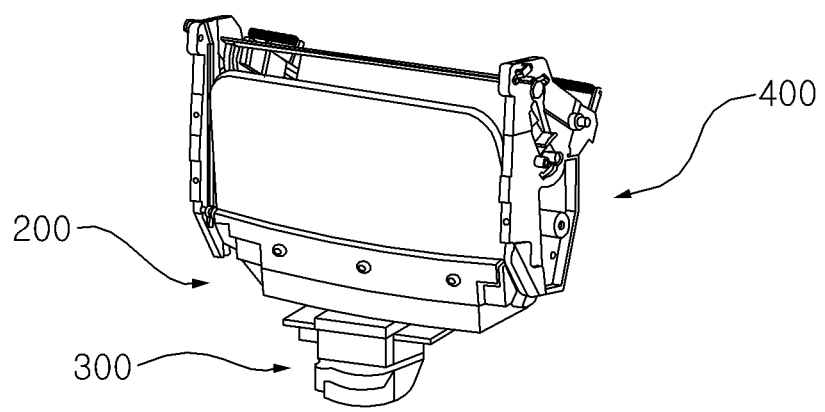
FIGS. 3A and 3B views for explaining an interior of the head-up display apparatus according to an embodiment of the present disclosure.
Figure 3B:
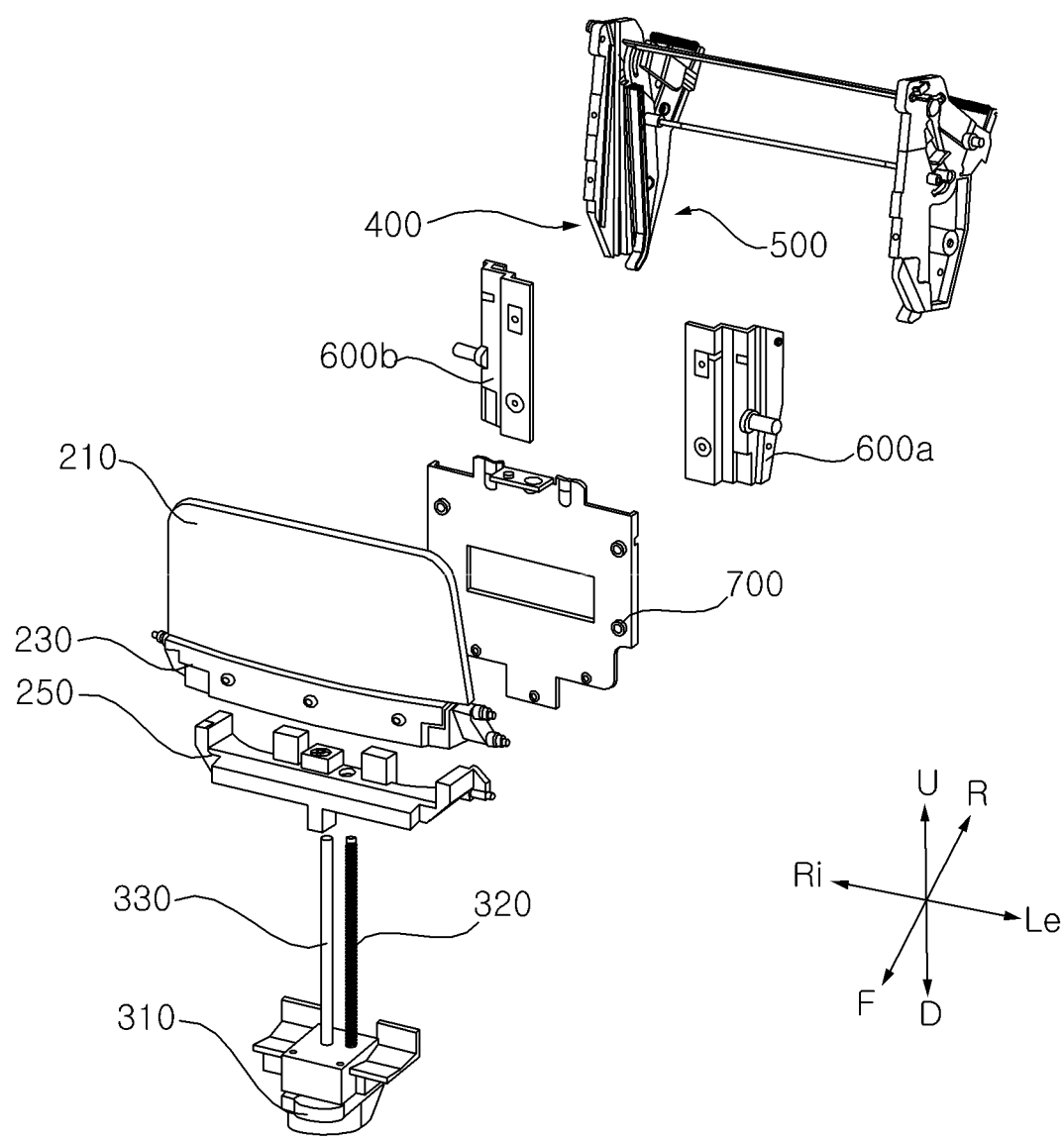

FIGS. 3A and 3B views for explaining an interior of the head-up display apparatus according to an embodiment of the present disclosure.

Referring to FIGS. 2, 3A, and 3B, the head-up display apparatus 100 may include an image output unit, an image transmitter, a housing 110, a combiner assembly 200, a driver 300, cam plates 400a and 400b, slot opening/closing devices 500a and 500b, cover gears 600a and 600b, and a bracket 700.

The image output unit may generate an image and project the image to the combiner 210. The head-up display apparatus 100 may further include an image transmitter which transfers the image generated by the image output unit to the combiner 210.

The image transmitter may include one or more reflectors which reflects the image generated by the image output unit and displays the reflected image on the combiner 210.

The head-up display apparatus 100 may include an image transmitting unit which transmits light in the housing 110 to an outside of the housing so that the image generated by the image output unit is displayed on the combiner 210 exposed outside the housing 110. The image transmitting unit may be formed of a light transmissive material and provided in the housing 110.

Referring to FIG. 2, the housing 110 may form an appearance of the head-up display apparatus 100.

The housing 110 may accommodate respective components which are included in the image output unit, the combiner assembly 200, the driver 300, the cam plates 400a and 400b, the slot opening/closing device 500, the cover gears 600a and 600b, and the bracket 700.

The housing 110 may include a plurality of housing members. Referring to FIG. 2, the housing 110 may be configured by connecting an upper housing member and a lower housing member to each other.

The housing 110 may include a shape for connection to a cockpit module of the vehicle 1 or the dashboard 10 of the cockpit module. For example, the housing 110 may include a fastener for fastening with the dashboard 10.

Figure 4:
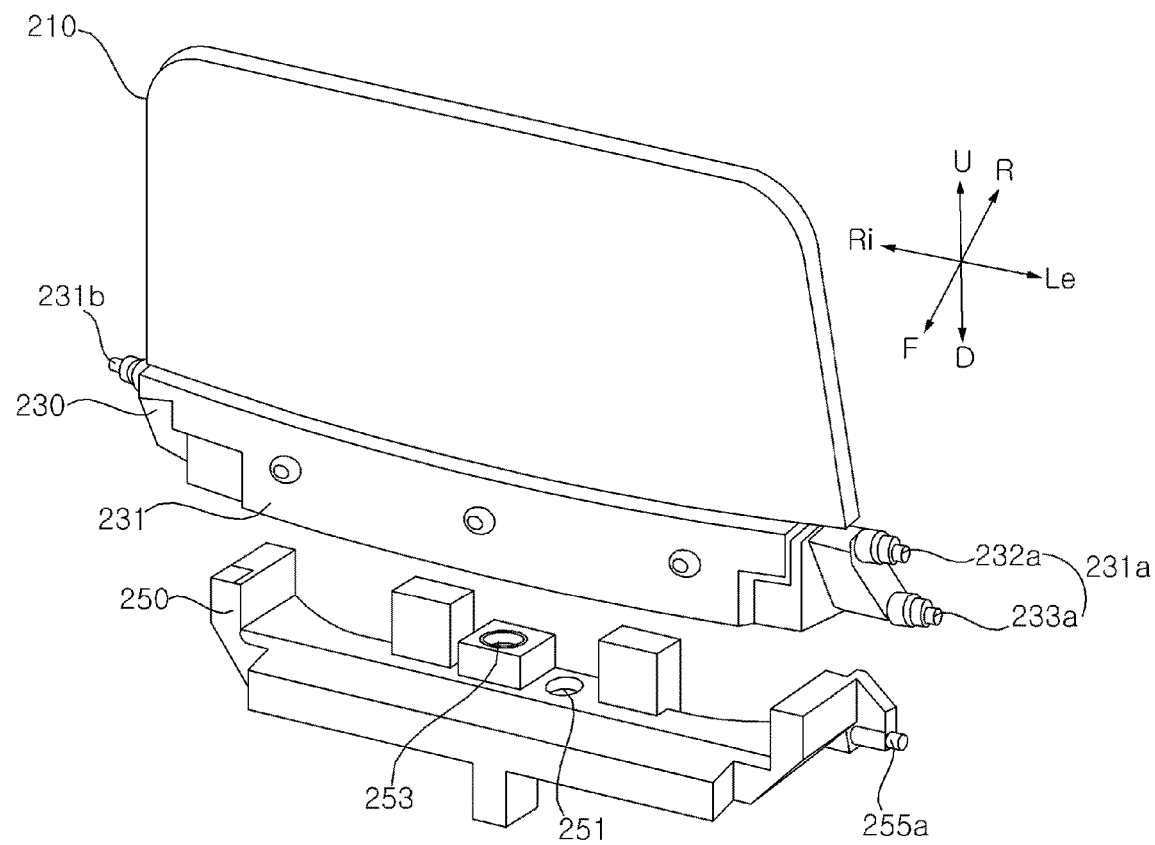
FIG. 4 is a view for explaining a combiner assembly according to an embodiment of the present disclosure.

FIG. 4 is a view for explaining a combiner assembly according to an embodiment of the present disclosure.

Referring to FIG. 4, the combiner assembly 200 may further include the combiner 210, a holder 230, and a lifting module 250.

The combiner 210 may be exposed outside the dashboard 10 by a driving force provided by the driver 300. The combiner 210 may be concealed into the slot formed in the dashboard 10 by the driving force provided by the driver 300.

The combiner 210 may be formed of a transparent or translucent material. For example, the combiner 210 may be formed of glass or a transparent synthetic resin.

The combiner 210 functions as a screen which displays an image projected from the image output unit.

The holder 230 may fix the combiner 210.

The combiner movement bosses 231a 231b may be formed, which slide along a first guide rail (410a in FIG. 7) and a second guide rail (420a in FIG. 7) provided in the cam plates 400a and 400b in a state where the combiner 210 is fixed.

The holder 230 may support the combiner 210. The holder 230 may include a supporter 231 for fixing and supporting the combiner 210 in the up-down direction.

The supporter 231 may support the combiner 210 in a state where the supporter 231 is in contact with one surface of the combiner 210. The supporter 231 and the combiner 210 may be fastened with each other by a predetermined fastening means. In a state where the combiner 210 is loaded on the holder 230, the support 231 may be connected to the holder 230 and the combiner 210 to firmly support the combiner 210.

The combiner movement bosses 231a and 231b may be provided in pairs on the left side and the right side. The combiner movement bosses 231a and 231b may be formed laterally symmetrically at both ends of the holder 230. The combiner movement boss may include a first combiner movement boss 231a and a second combiner movement boss 231b.

The first combiner movement boss 231a may include a first pin 232a and a second pin 233a.

Figure 7:
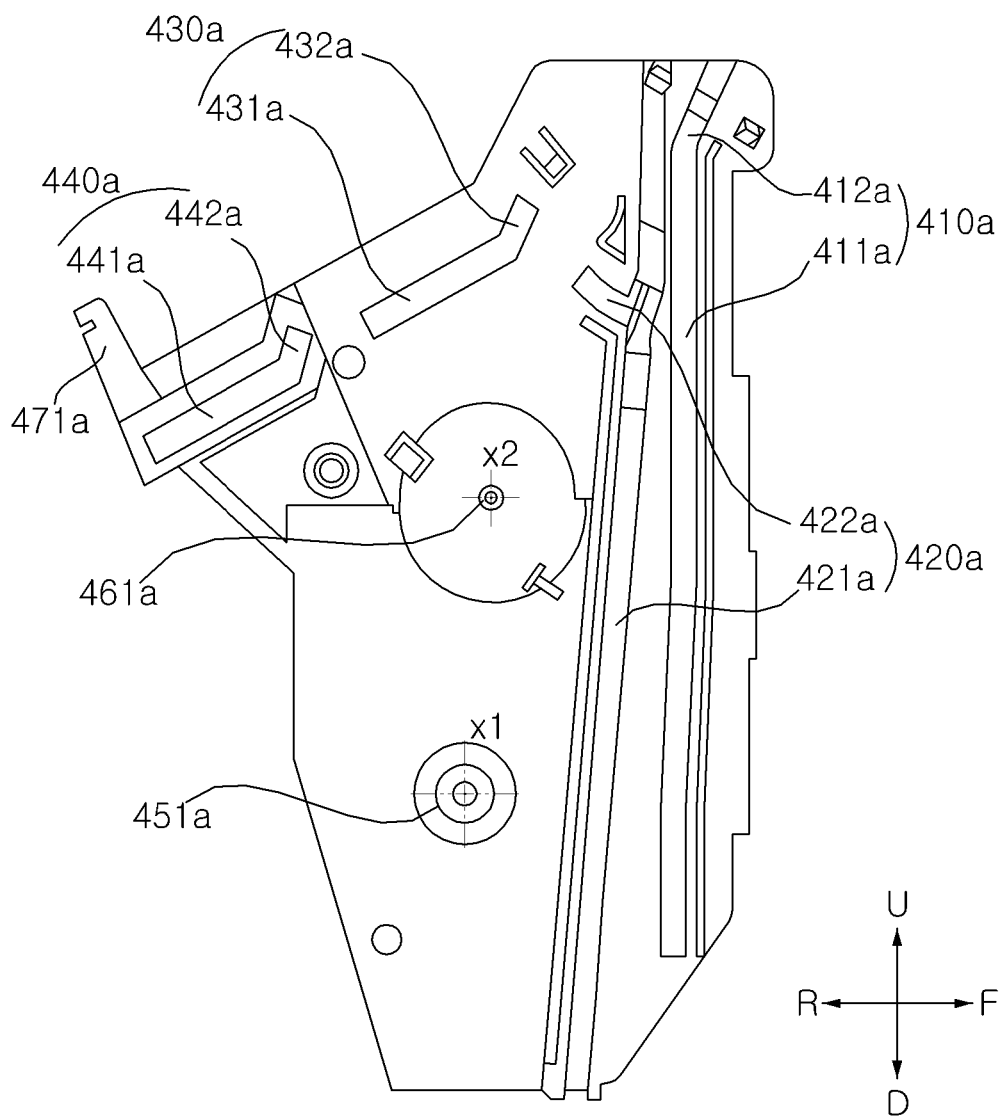
FIG. 7 is a view for explaining a cam plate according to an embodiment of the present disclosure.

The first pin 232a may be formed to protrude from the holder 230 toward the first guide rail (410a of FIG. 7). The first pin 232a may move along the first guide rail 410a.

The second pin 233a may be formed to protrude from the holder 230 toward the second guide rail (420a of FIG. 7).

The second fin 233a may be formed to be separated from the first fin 232a. For example, the second fin 233a may be formed below the first fin 232a. For example, the second fin 233a may be formed behind the first fin 232a.

The second pin 233a may move along the second guide rail 420a.

The first pin 232a and the second pin 233a are respectively moved along the first guide rail 410a and the second guide rail 420a, and thus, the combiner assembly 200 may slide up and down along a fixed path. More specifically, the first pin 232a and the second pin 233a are respectively moved along the first guide rail 410a and the second guide rail 420a, and thus, the holder 230 may slide up and down along a fixed path.

The second combiner movement boss 231b may be formed symmetrically with the first combiner movement boss 231a.

That is, the second combiner movement boss 231b may include a first pin 232b and a second pin 233b. The first fin and the second fin included in the second combiner movement boss 231b are formed laterally symmetrically with the first fin 232a and the second fin 233a respectively included in the first combiner movement boss 231a.

As for the description of the second combiner movement boss 231b, the description of the first combiner movement boss 231a may be applied.

A driving force may be transferred through a driving shaft 320 of the driver 300 to the lifting module 250, and the lifting module 250 may move in the up-down direction.

A driving shaft through-hole 251 through which the driving shaft 320 of the driver 300 passes may be formed in the lifting module 250.

The driving shaft through hole 251 has a protrusion line which is engaged with a thread formed in the driving shaft 320 to be described later and is formed in the through hole 251, and the lifting module 250 may receive the driving force upward or downward according to the rotation of the driving shaft 320.

The lifting module 250 may have a guide shaft through-hole 253 through which the guide shaft 330 of the driver 300 passes.

The guide shaft through-hole 253 has a straight hole through which the guide shaft 330 to be described later passes, and thus, the lifting module 250 slides based on the guide shaft 330 and a vertical movement of the lifting module 250 is guided.

The guide shaft through-hole 253 may be provided at a center of the lifting module 250. The guide shaft through-hole 253 may be formed in a portion which protrudes up and down of the lifting module 250.

The lifting module 250 may include a lifting module boss 255 which protrudes toward lever guide rails 531a and 531b of levers 530a and 530b to be described later.

Figure 5:
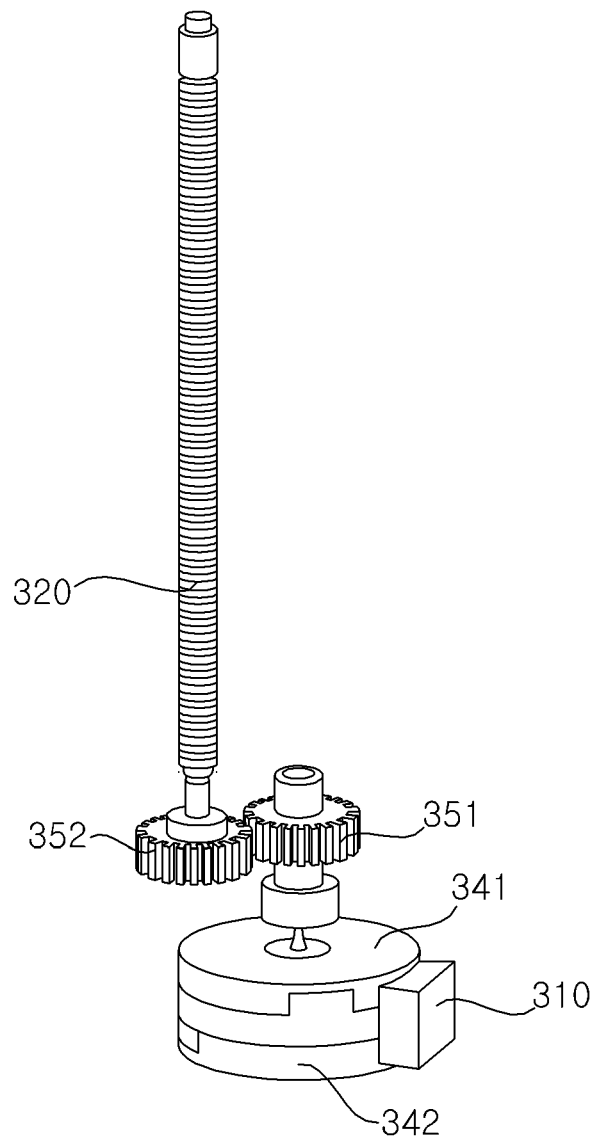
FIGS. 5, 6A, and, 6B are view for explaining a driver according to an embodiment of the present disclosure.
Figure 6A:
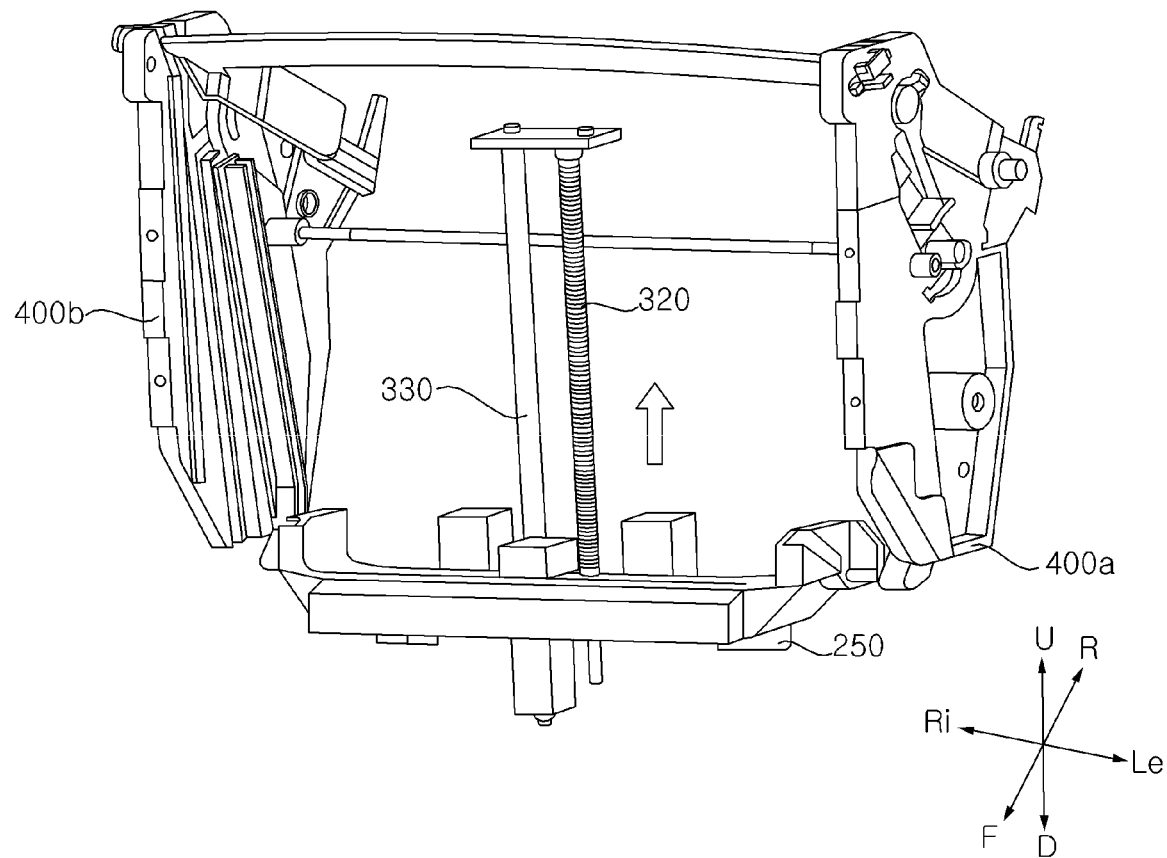
Figure 6B:
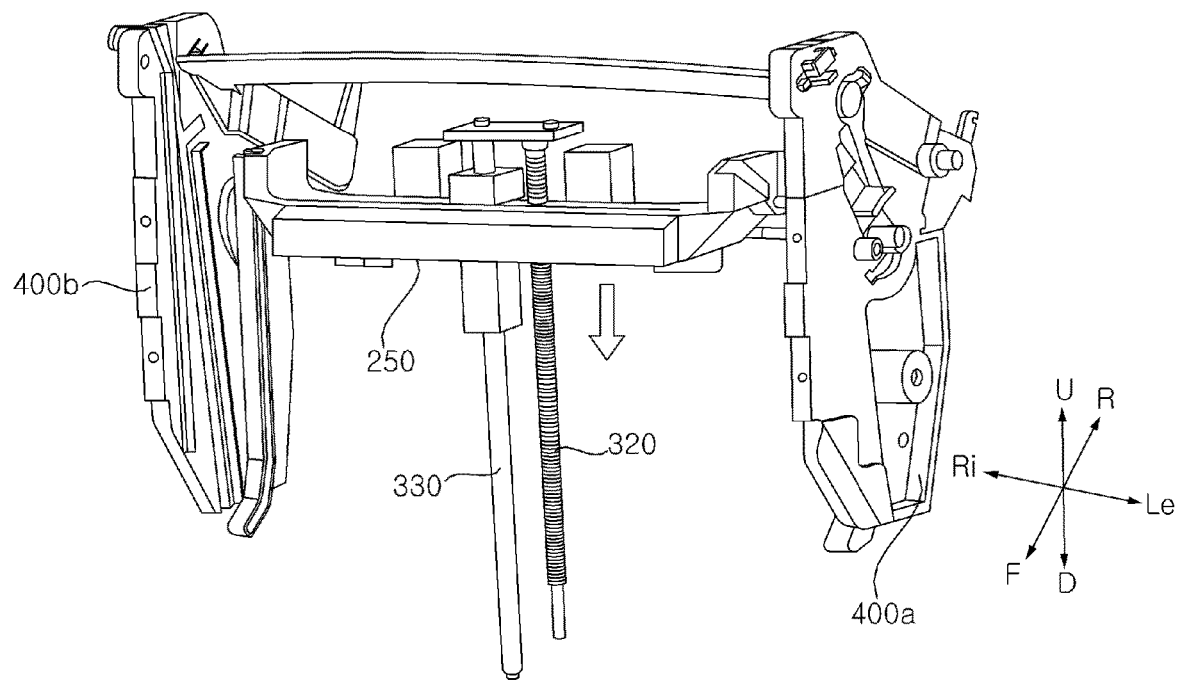

FIGS. 5, 6A, and, 6B are view for explaining a driver according to an embodiment of the present disclosure.

The driver 300 may generate the driving force. The driver 300 may include a motor 310. The driver 300 may provide the driving force generated by the motor 310.

The motor 310 may be a step motor which can control a rotation by a desired angle. The step motor can control a rotation angle and a rotation speed.

The motor 310 may transfer the driving force to the driving shaft 320.

The motor 310 may be connected to one or more gears 351 and 352.

The motor 310 may transfer the driving force to the driving shaft 320 through one or more gears 351 and 352.

The driving shaft 320 may receive a driving force from the motor 310 through one or more gears 351 and 352 engaged with each other and may be rotated.

The driving shaft 320 may have a thread formed on a surface of the shaft.

The driving shaft 320 may pass through the driving shaft through-hole 251 of the lifting module 250. The driving shaft 320 may be rotated by the motor 310 and may provide the driving force for driving the lifting module 250 up and down.

One end of the driving shaft 320 is connected to the driver 300, the other end of the driving shaft 320 is rotatably connected to the bracket 700, and thus, a position of the driving shaft 320 may be fixed.

Unlike the driving shaft 320, the guide shaft 330 may have a smooth surface without a thread.

The guide shaft 330 may pass through the guide shaft through-hole 253 of the lifting module 250. When the lifting module 250 moves up and down, the guide shaft 330 may guide the lifting module 250 in a movement direction.

One end of the guide shaft 330 is connected to the driver 300, the other end of the guide shaft 330 is connected to the bracket 700, and thus, a position of the guide shaft 330 may be fixed.

The driver 300 may include vibration dampers 341 and 342 for damping vibrations of the motor 310 and one or more gears 351 and 352 for transferring a rotational force of the motor 310 to the driving shaft 320.

One or more gears 351 and 352 may be engaged with each other and may receive the driving force from the motor 310 so as to be rotated.

The driver 300 may provide a driving force to the combiner assembly 200 and/or the slot opening/closing device 500.

Referring to 6A and 6B, the driver 300 may provide a driving force for vertical sliding of the combiner assembly 200. The driving shaft 320 is rotated, the guide shaft 330 and the driving shaft 320 guide the driver 300 in the sliding direction, and thus, the lifting module 250 can be driven to move up or down.

For example, the driver 300 may provide a driving force for tilting the combiner 210. For example, the driver 300 may provide a driving force for opening or closing the door 510 of the slot opening/closing device 500.

Accordingly, the combiner 210 may be exposed, hidden, or tilted or the door 410 may be opened or closed by the driving force provided from one driver 300. Since a plurality of operations can be performed by one driver 300, the number of components is reduced, and thus, an overall volume of the head-up display apparatus is reduced.

FIG. 7 is a view for explaining a cam plate. FIG. 7 shows an inside of the left cam plate 400a.

The head-up display apparatus 100 may include the pair of left and right cam plates 400a and 400b.

The pair of cam plates 400a and 400b may be configured to be symmetrical with each other. Each of the cam plates 400a and 400b may be formed to have a constant thickness.

The combiner assembly 200, the driver 300, the slot opening/closing device 500, the cover gears 600a and 600b, the cover gears 600a and 600b, and the bracket 700 may be disposed between facing surfaces of the pair of the cam plates 400a and 400b.

Each of the facing surfaces of the pair of cam plates 400a and 400b may have a constant area such that components disposed therebetween are covered from both sides.

The first guide rails 410a and 410b and the second guide rail 420a and 420b for guiding the movement of the combiner 210 may be provided on the facing surfaces of the pair of cam plates 400a and 400b.

Referring to FIG. 7, the left cam plate 400a may have the first guide rail 410a and the second guide rail 420a on an inner surface thereof. That is, the first guide rail 410a and the second guide rail 420a may be formed on a surface facing the combiner assembly 200.

The first guide rail 410a may guide the movement of the first pin 232a included in the first combiner movement boss 231a.

The first guide rail 410a may include a movement guide pass 411a and a pivot point 412a.

The movement guide pass 411a may guide the vertical sliding of the combiner assembly 200.

The pivot point 412a may be formed as a pivot shaft during tilting.

The second guide rail 420a may guide the movement of the second pin 233a included in the first combiner movement boss 231a.

The second guide rail 420a may include a movement guide pass 421a and a tilting guide pass 422a.

The movement guide pass 421a may guide the vertical sliding of the combiner assembly 200.

The tilting guide pass 422a may guide pivoting during tilting of the combiner 210.

The first pin 232a of the first combiner movement boss 231a may be formed to protrude toward the inside of the first guide rail 410a from the holder 230.

The first pin 232a may be inserted into the first guide rail 410a and may slide up and down along the first guide rail 410a.

The second pin 233a of the first combiner movement boss 231a may be formed to protrude toward the inside of the second guide rail 420a from the holder 230.

The second pin 233a may be inserted into the second guide rail 420a and may be moved along the second guide rail 420a.

The first pin 232a and the second pin 233a are respectively moved along the first guide rail 410a and the second guide rail 420b, and thus, the combiner assembly 200 may slide up and down along the fixed path. Accordingly, the combiner 210 may be exposed to the outside or may be hidden in a slot formed in the dashboard 10.

The right cam plate 400b may have the first guide rail 410b and the second guide rail 420b on an inner surface thereof. That is, the first guide rail 410b and the second guide rail 420b may be formed on a surface facing the combiner assembly 200.

The right cam plate 400b may have the first guide rail 410b and the second guide rail 420b formed to have shapes symmetrical to the first guide rail 410a and the second guide rail 420a formed on the left cam plate 400a.

Referring to FIG. 7, the left cam plate 400a may have a third guide rail 430a and a fourth guide rail 440a on an inner surface thereof. That is, the third guide rail 430a and the fourth guide rail 440a may be formed on a surface facing the door 510.

The third guide rail 430a may be formed at a position facing the door 510 on an upper end of the left cam plate 400a.

The third guide rail 430a may include a third guide rail rear end 431a and a third guide rail front end 432a.

The third guide rail rear end 431a may guide sliding in first and second directions of the door 510. Referring to FIG. 7, the first direction may be a direction toward a front upper side. Unlike the first direction, the second direction may be a direction toward a rear lower side.

The third guide rail front end 432a may guide the sliding of the door 510 in a direction more upward than the first direction.

The fourth guide rail 440a may be formed at a position facing the door 510 at an upper end of the left cam plate 400a. The fourth guide rail 440a may be disposed behind the third guide rail 430a. The fourth guide rail 440a may be disposed below the third guide rail 430a.

The fourth guide rail 440a may include a fourth guide rail rear end 441a and a fourth guide rail front end 442a.

The fourth guide rail rear end 441a may guide sliding in first and second directions of the door 510. Referring to FIG. 7, the first direction may be a direction toward a front upper side. Unlike the first direction, the second direction may be a direction toward a rear lower side.

The first and second directions of the fourth guide rail rear end 441a of the fourth guide rail 440a may be the same as the first and second directions of the third guide rail rear end 431a of the third guide rail 430a.

The fourth guide rail front end 442a may guide the sliding of the door 510 in a direction more upward than the first direction.

A direction in which the fourth guide rail front end 442a of the fourth guide rail 440a extends may be the same as a direction in which the third guide rail front end 432a of the third guide rail 430a extends.

That is, the third guide rail 430a and the fourth guide rail 440a may be provided in the same shape only with the difference in the positions where they are arranged.

The left cam plate 400a may include a lever connection groove (451a) into which a cover gear boss 610a of the cover gear 600 is inserted and which connects the left cam plate 400a, a lever 530, and the cover gear 600.

The lever connection groove 451a may have a cylindrical shape having one or more steps.

For example, the lever connection groove 451a may have a cylindrical shape having one or more steps in a direction opposite to a direction in which the lever 530a is disposed.

A diameter of the lever connection groove 451a may be formed to have a size into which the cover gear boss 610a of the cover gear 600a can be inserted.

The left cam plate 400a may include a lever-door link connection boss (461a) which is formed to protrude toward a lever-door link 550a.

The right cam plate 400b may include a lever connection hole 451b which is formed symmetrically with the lever connection groove 451a of the left cam plate 400a.

The lever-door link connection boss 461a is inserted into a hole formed in the lever-door link 550a and may be a rotary shaft about which the lever-door link 550a rotates.

The lever-door link connection boss 461a may be formed to be shorter than a length of a lever-door link through-hole 553a formed at the center of the lever-door link 550a. Accordingly, the lever-door link 550a may be connected to the left cam plate 400a and the pair of lever-door links 550a and 550b may be connected to each other by a shaft sink 555.

The left cam plate 400a may be formed such that a surface in contact with the lever 530a and a surface in contact with the lever-door link 550a are stepped with each other.

The left cam plate 400a may be formed such that a step between the surface in contact with the lever 530a and the surface in contact with the lever-door link 550a corresponds to the formation of the lever-door link 550a.

For example, referring to FIG. 7, the left cam plate 400a may have a step formed to be recessed in a semicircle downward on an upper side of the surface in contact with the lever 530a. Accordingly, the lever-door link 550a can rotate within a rotation range without being interfered with the left cam plate 400a.

In the left cam plate 400a, a surface facing the lever 530a may be formed in a plurality of steps such that the lever 530a and the lever-door link 550a overlap each other to be connected to left cam plate 400a. Accordingly, it is possible to reduce a size and weight of the head-up display apparatus 100.

The right cam plate 400b may have a lever-door link connection boss 461b which is formed symmetrically with the lever-door link connection boss 461a of the left cam plate 400a.

The right cam plate 400b may be configured to be laterally symmetrical with the left cam plate 400a. As for the description of the right cam plate 400b, the description of the left cam plate 400a may be applied.

Figure 8:
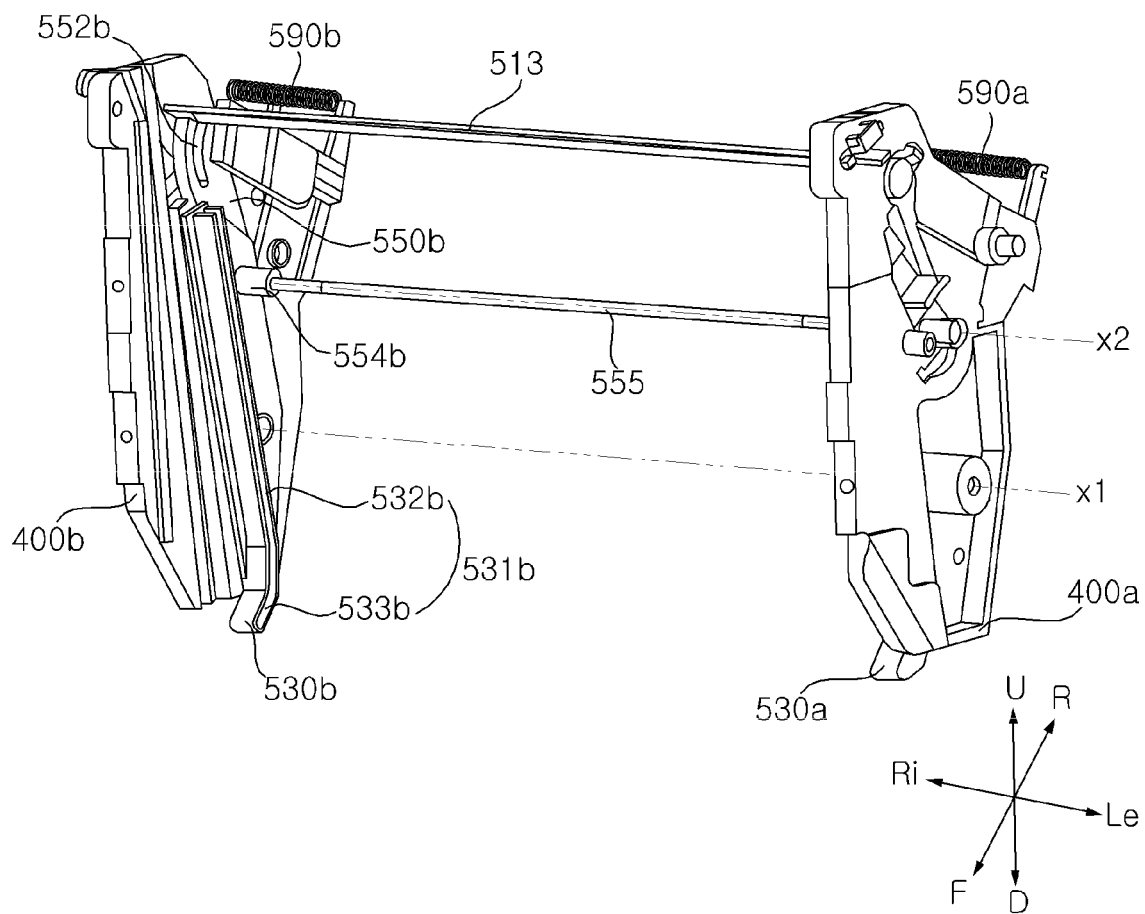
FIG. 8 is a view for explaining a slot opening/closing device according to an embodiment of the present disclosure.

FIG. 8 is a view for explaining a slot opening/closing device according to an embodiment of the present disclosure.

Figure 9:
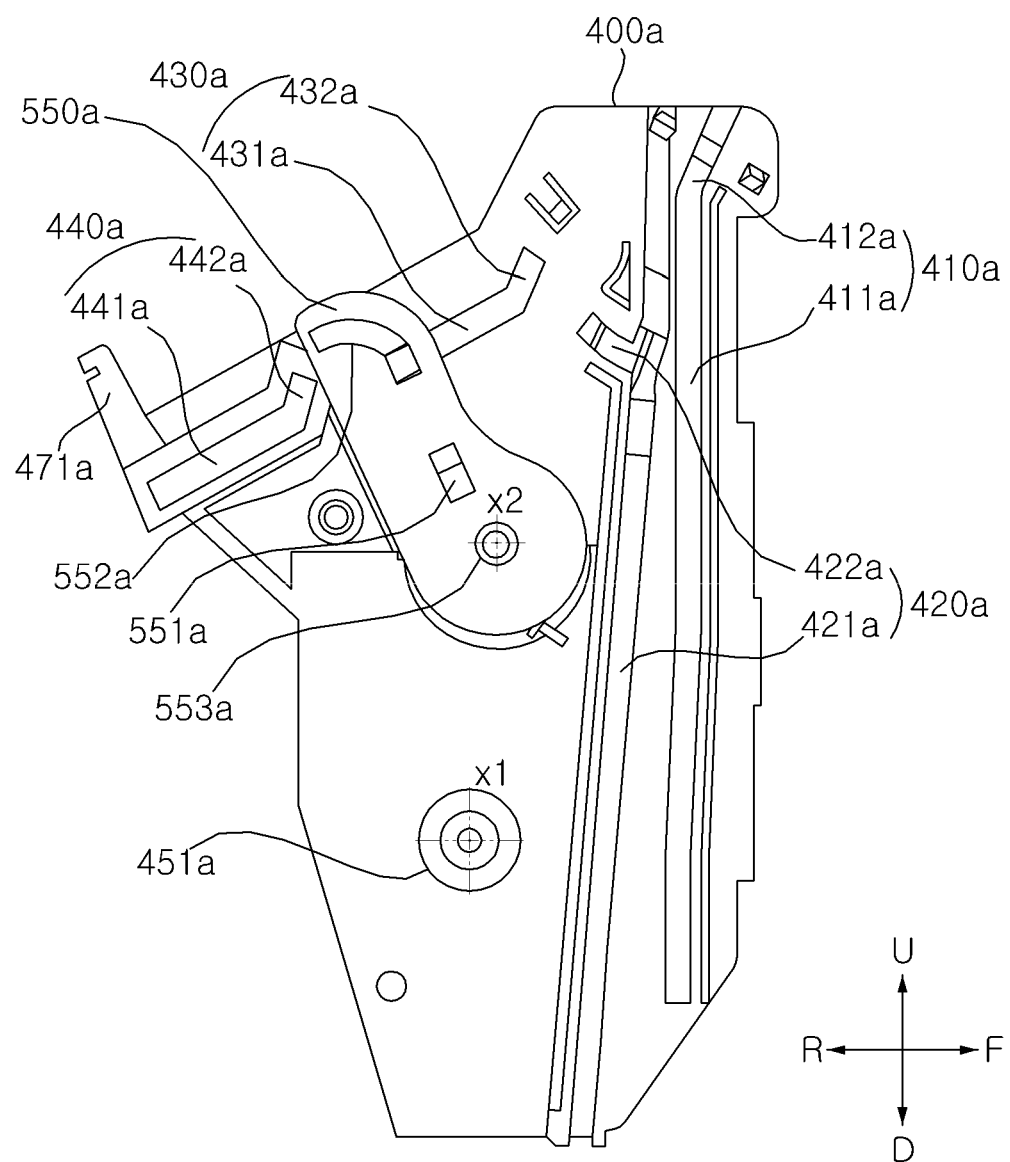
FIG. 9 is a view showing a state in which a lever-door link is installed on a left cam plate.

FIG. 9 is a view showing a state in which the lever-door link is installed on the left cam plate.

Figure 10:
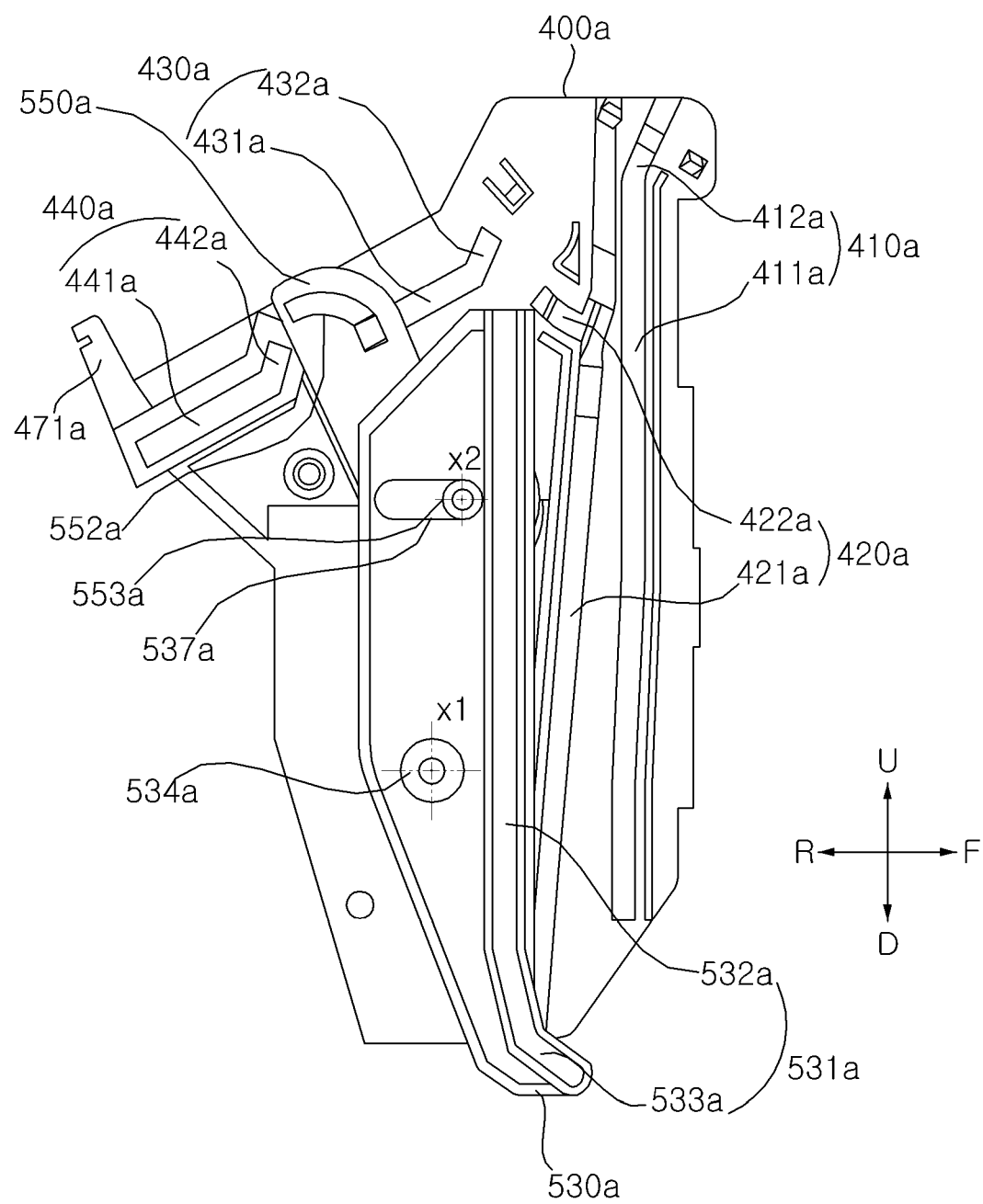
FIG. 10 is a view showing a state in which the lever-door link and a lever are installed on the left cam plate.

FIG. 10 is a view showing a state in which the lever-door link and the lever are installed on the left cam plate.

Figure 11A:
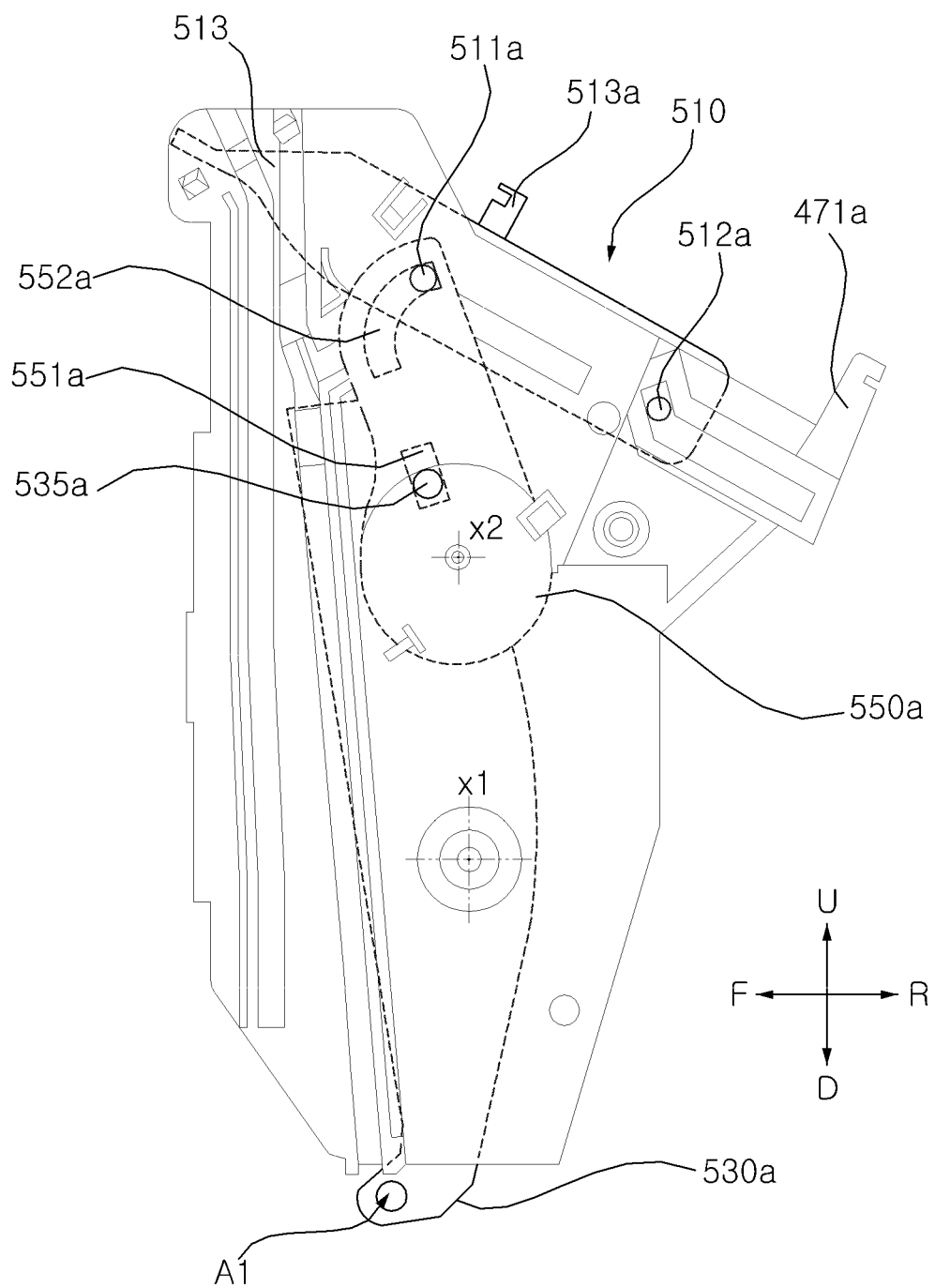
FIGS. 11A and 11B are views for explaining an operation of the slot opening/closing device according to an embodiment of the present disclosure.
Figure 11B:
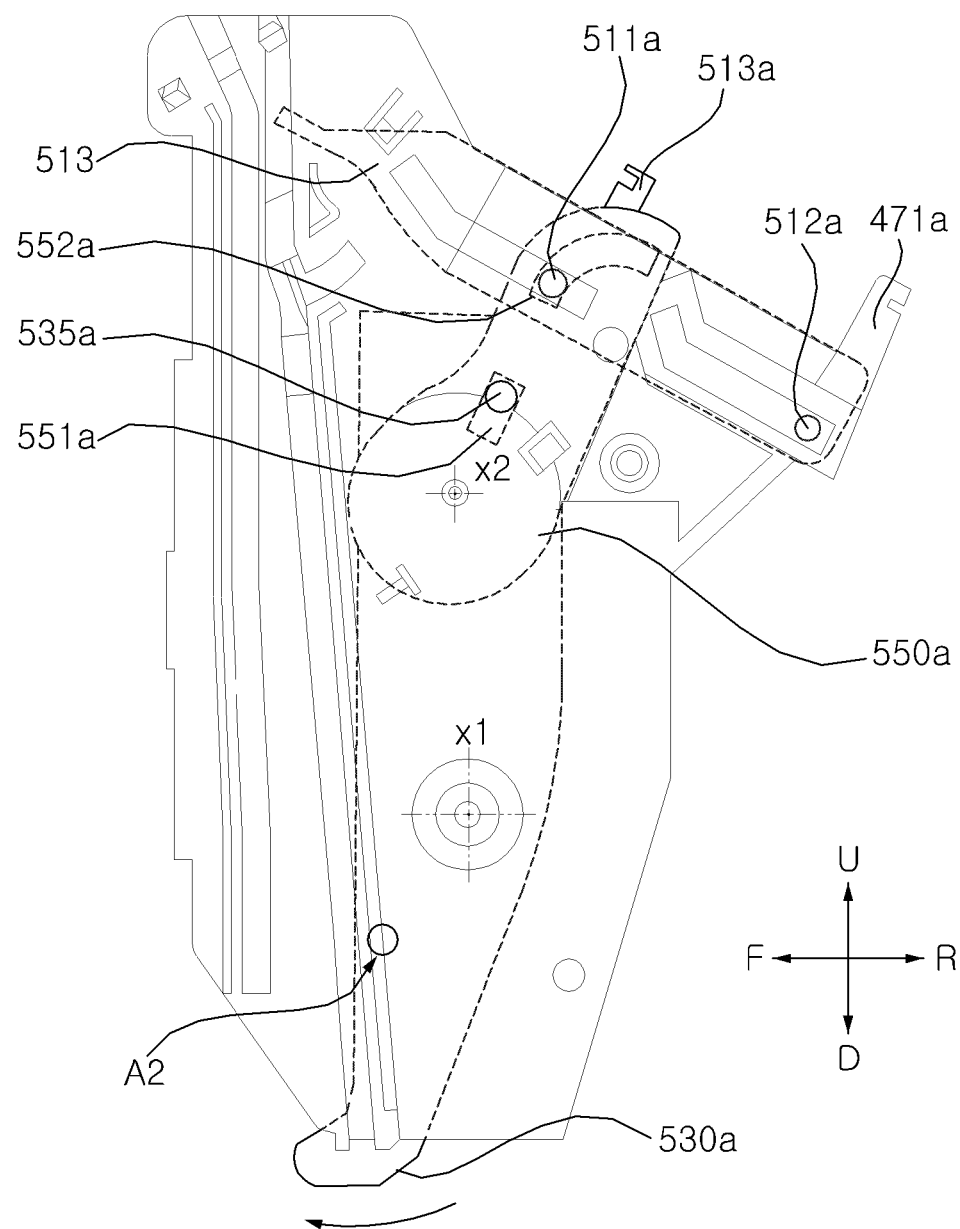

FIGS. 11A and 11B are views for explaining an operation of the slot opening/closing device according to an embodiment of the present disclosure.

Figure 12A:
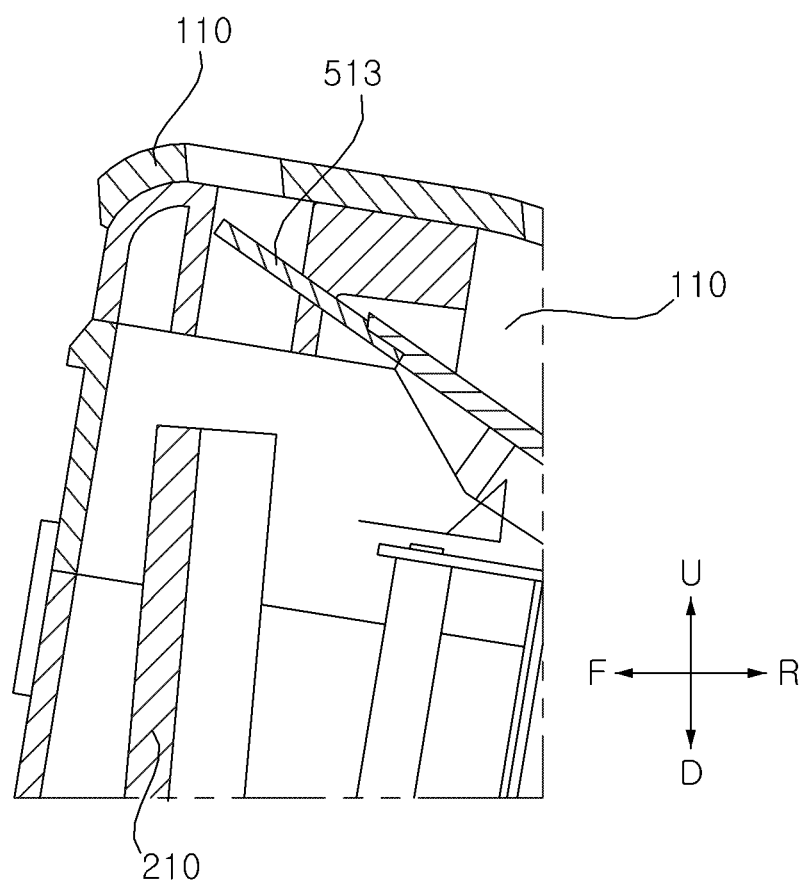
FIGS. 12A and 12B are views for explaining the operation of the slot opening/closing device according to an embodiment of the present disclosure.
Figure 12B:
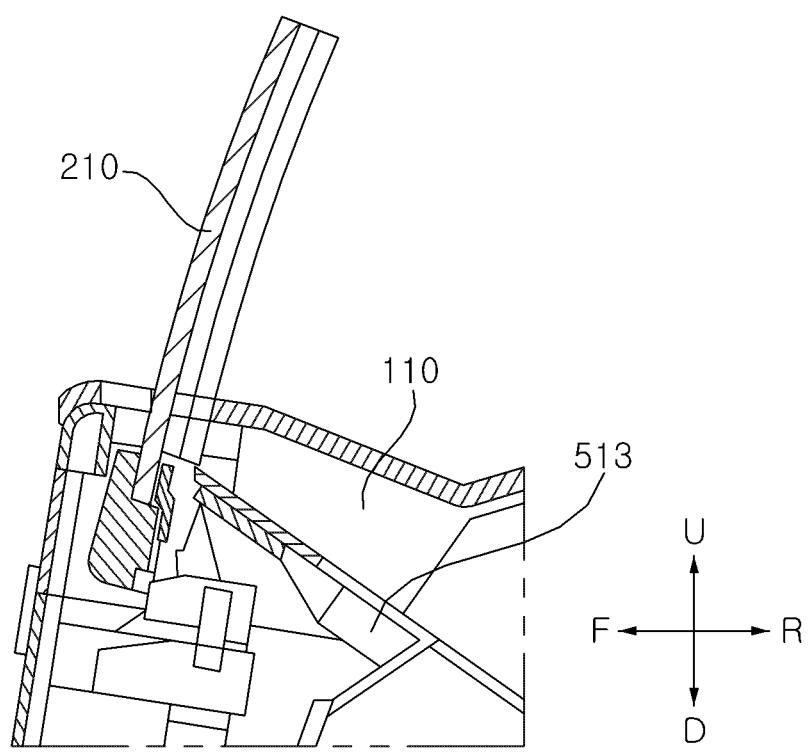

FIGS. 12A and 12B are views for explaining the operation of the slot opening/closing device according to an embodiment of the present disclosure.

The head-up display apparatus 100 may include the slot opening/closing device 500. The slot opening/closing device 500 may expose or hide the combiner 210, depending on whether the head-up display is used.

Referring to FIGS. 8 to 12B, the slot opening/closing device 500 may include the door 510, the levers 530a and 530b, and the lever-door links 550a and 550b.

The door 510 may open or close the slot.

The door 510 may include a cover 513 which closes the slit when the combiner 210 is hidden.

The door 510 may extend in a rear side from both right and left ends of the cover 513, and may be provided in a "U" shape so that a surface facing the inner surfaces of the cam plates 400a and 400b is formed.

The cover 513 is formed to have a predetermined length to the right and left, a width of the cover 513 is formed by a width of the slit front and rear, the cover 513 is formed to have a predetermined thickness, and thus, the cover 513 may be formed in a plate-like shape.

Referring to 12A and 12B, the cover 513 may be hidden inside the housing 110 or exposed outside the housing 110 as the combiner 210 is exposed or hidden.

The cover 513 may open and close the slot formed in the housing 110. The cover 513 may be moved by receiving the driving force from the driver 300.

Referring to FIGS. 11A and 11B, the door 510 may include a first door pin 511a and a second door pin 512a on a left surface facing the left cam plate 400a.

The first door pin 511a may protrude toward the third guide rail 430a of the left cam plate 400a. The first door pin 511a may be inserted into the third guide rail 430a so as to slide.

The first door pin 511a may be inserted into a lever link groove 551a of the lever-door link 550a so as to slide.

The first door pin 511a may be inserted into the third guide rail 430a after passing through the lever link groove 551a.

A movement direction of the first door pin 511a may be guided by the third guide rail 430a.

The door 510 may be opened and closed by receiving the driving force from the lever-door link 550a through the first door pin 511a.

The door 510 may move in a state where the first door pin 511a is inserted into the third guide rail 430a of the left cam plate 400a, and thus, the movement direction of the door 510 may be guided.

The second door pin 512a may protrude toward the fourth guide rail 440a of the left cam plate 400a. The second door pin 512a may be inserted into the fourth guide rail 440a so as to slide.

A movement direction of the second door pin 512a may be guided by the fourth guide rail 440a.

The door 510 may move in a state where the first door pin 511a is inserted into the third guide rail 430a of the left cam plate 400a and the second door pin 512a is inserted into the fourth guide rail 440a of the left cam plate 400a, and thus, the movement direction of the door 510 may be guided.

The door 510 may further include a second elastic body connection protrusion 471a in contact with an elastic body 590a at a left end of the door 510.

In the second elastic body connection protrusion 471a, a protrusion protruding upward is connected to the elastic body 590a, and thus, the second elastic body connection protrusion 471a receives an elastic force in one direction.

For example, the door 510 may receive the elastic force in a direction in which the door 510 is closed by the elastic body 590a, and thus, the door 510 may be closed to be in close contact with the slot.

Alternatively, the door 510 may receive an elastic force in a direction in which the door 510 is opened by the elastic body 590a, and thus, the door 510 may move more quickly when the door 510 is opened.

The door 510 may be provided laterally symmetrically with each other. Accordingly, the above description of the left portion of the door 510 may be applied to the right side portion of the door 510.

Referring to FIGS. 8, 10, 11A, and 11B, in the levers 530a and 530b, one lever may be provided on the right side or the left side. Alternatively, in the levers 530a and 530b, the pair of levers 530a and 530b may be provided laterally symmetrically with each other.

In the following, a case where the pair of levers is provided will be described as an example, but this is only an example, and it is also possible that the lever is provided only on either the left or the right.

Hereinafter, the lever will be described based on the left lever 530a.

The lever 530a may be provided to be rotatable about the lever rotation shaft x1.

The lever guide rail 531a extending up and down is formed at a front end of the lever 530a, and thus, the combiner assembly 200 may be slidably connected to the lever 530a.

The lever 530a may rotate about the lever rotation shaft x1 formed closer to the lifting module 250 than the door 510 in a state where the combiner 210 is hidden.

The lever guide rail 531a may have a shape protruding in a direction toward the lifting module 250.

The lever guide rail 531a may include a lever guide rail upper end 532a extending straightly.

The lever guide rail 531a may include a lever guide rail lower end portion 533a which is connected to the lever guide rail upper end portion 532a and is curved further forward than the lever guide rail upper end portion 532a.

The lever guide rail upper end portion 532a may extend up and down by a predetermined length at a front end of the lever 530a, and thus, a lifting module boss 255a of the lifting module 250 may be inserted into the lever guide rail upper end portion 532a so as to be moved.

In the lever guide rail upper end portion 532a, the lifting module 250 is raised in a state where the lifting module boss 255a is inserted into the lever guide rail upper end portion 532a, and a length of the lever guide rail upper end portion 532a may be formed such that the combiner 210 is exposed outside the housing 110 and is located at a designated position.

The lever guide rail lower end portion 533a may be formed such that one end thereof is connected to the lever guide rail upper end portion 532a and the other end thereof is curved further forward and lower than a direction in which the lever guide rail upper end portion 532a extends.

The lever guide rail lower end portion 533a is formed in a shape curved at least once, and when the lifting module 250 starts to raise in a state where the lifting module 250 is located at the lowermost end of the lever guide rail lower end portion 533a, the door 510 is opened by the rotation of the lever 530a.

For example, the lever guide rail lower end portion 533a may be smoothly formed in a curved shape. In this case, as described below, the door 510 which is opened and closed by the driving force by the lever 530a may be smoothly moved.

For example, as shown in FIG. 10, the lever guide rail lower end portion 533a may be formed to be curved in a plurality of curved shapes. In this case, the door 510 may be moved in moderation.

The curved portion of the lever guide rail lower end portion 533a may be smoothly rounded to allow the lifting module boss 255a to slide smoothly along the lever guide rail lower end portion 533a.

As the curvature of the lever guide rail lower end portion 533a increases, the lifting module 250 raises, and thus, the door 510 can be opened fast. However, as the curvature of the lever guide rail lower end portion 533a increases, a friction between the lifting module boss 255a and the lever guide rail 531a increases when the lifting module 250 is raised.

For example, the lever guide rail lower end portion 533a may be formed to have an angle of 60° or less based on the vertical direction.

A connection portion between the lever guide rail upper end portion 532a and the lever guide rail lower end portion 533a is smoothly rounded to minimize the friction generated when the lifting module boss 255a slides along the lever guide rail 531a.

Referring to FIGS. 11A and 11B, the lever 530a may include a lever boss 535a which is connected to the lever-door link 550a.

The lever boss 535a may have a pin shape protruding toward the lever-door link 550a.

The lever boss 535a may be inserted into the lever link groove 551a formed in the lever-door link 550a so as to slide.

The lever boss 535a rotates together with the lever 530a, and can transfer the driving force so that the lever-door link 550a rotates about the lever-door link rotation axis x2.

Referring to FIG. 10, the lever 530a may include a shaft sink through-hole 537a through which the shaft sink 555 connecting the pair of lever-door links 550a and 550b to each other passes.

The shaft sink through-hole 537a may have a hole shape which is curved and extended in the rotation direction of the lever 530a such that the lever 530a can rotate without being obstructed in a state where the shaft sink 555 and/or the lever-door link protrusion 554a connected to the shaft sink 555 passes through the shaft sink through-hole 537a. That is, in a state where the lever-door link protrusion 554a located on the lever-door link rotation axis x2 passes through the lever 530a, the shaft sink through-hole 537a may be formed such that the lever 530a can rotate about the lever rotation axis x1.

The shaft sink through-hole 537a may guide the rotation direction when the lever 530a rotates.

The right lever 530b may include the lever guide rail 531b, a lever boss 535b, and a shaft sink through-hole 537b. The lever 530b may be provided to be rotatable about the lever rotation axis x1.

The right lever 530b may be provided laterally symmetrically with the left lever 530a. Accordingly, the above description of the left lever 530a may be applied to the right lever 530b.

The lever-door links 550a and 550b may mechanically connect the levers 530a and 530b and the door 510 to each other such that the driving force transferred from the levers 530a and 530b is transferred to the door 510.

One end of each of the lever-door links 550a and 550b may be connected to the door, and each of the lever-door links 550a and 550b may rotate about the lever-door link rotation shaft x2.

The lever-door links 550a and 550b may rotate about the lever-door link rotation axis x2, which is disposed closer to the door 510 than the lever rotation axis x1. That is, the lever-door link rotation axis x2 may be located above the lever rotation axis x1.

The pair of lever-door links 550a and 550b may be provided with laterally symmetrically with each other.

Hereinafter, the lever-door links 550a and 550b will be described based on the left lever-door link 550a.

Referring to FIGS. 9, 10, 11A, and 11B, the door link 550a may be disposed such that a virtual line extending from the lever-door link rotation axis x2 passes through the left lever 530a and at least a portion of the lever-door link 550a overlaps the lever 530a.

Accordingly, the lever-door link 550a may be disposed such that at least a portion of the lever-door link 550a overlaps the lever 530a, and thus, it is possible to minimize the volume of the slot opening/closing device 500.

The lever-door link 550a may include the lever link groove 551a connected to the lever boss 535a.

The lever link groove 551a may be provided in a shape of a groove or hole extending radially based on the lever-door link rotation axis x2.

The lever boss 535a may be inserted into the lever link groove 551a so as to be connected to the lever link groove 551a.

The lever link groove 551a rotates in a state where the lever boss 535a is inserted into the lever link groove 551a when the lever 530a rotates about the lever rotation axis x1, and thus, the lever-door link 550a may receive the driving force from the lever 530a.

The lever boss 535a of the lever 530a rotates about the lever rotation axis x1 and the lever link groove 551a of the lever-door link 550a rotates about the lever-door link rotation axis x2. Therefore, the rotation radii thereof are different from each other. Accordingly, in order for the lever 530a and the lever-door link 550a to rotate while being engaged with each other about different rotation axes, the lever link groove 551a should be formed to have a predetermined length so that the lever boss 535a can slide.

For example, the lever link groove 551a may have a shape of a hole radially extending based on the lever-door link rotation axis x2 from a point away from the lever-door link rotation shaft x2 by r1 to a point away from the lever-door link rotation axis x2 by r2, on a surface of the lever-door link 550a facing the lever 530a.

Accordingly, the lever 530a and the lever-door link 550a are not fixed, and the lever-door link 550a can rotate about the lever-door link rotation axis x2 when the lever 530a rotates about the lever rotation axis x1.

Although not shown, on the contrary, a link groove may be formed in the lever 530a, a boss may be formed in the lever-door link 550a, and the lever 530a and the lever-door link 550a may rotate while being engaged with each other. In this case, the link groove formed in the lever 530a should be formed in a shape extending by a predetermined length in the radial direction of the lever rotation axis x1, as can be understood as in the lever link groove 551a described above.

Referring to FIGS. 9, 11A, and 11B, the lever-door link 550a may include a door guide rail 552a which provides a driving force to the door 510 to open or close the door 510.

The door guide rail 552a may be formed on a surface of the lever-door link 550a facing the door 510. The door guide rail 522 may be formed in a hole penetrating one side and the other side of the lever-door link 550a.

The door guide rail 552a may be a curved hole. The first door pin 511a may be inserted into the door guide rail 552a so as to be connected to the door guide rail 552a.

The door guide rail 552a rotates in a state where the first door pin 511a is inserted into the door guide rail 552a when the lever-door link 550a rotates about the lever-door link rotation shaft x2, and thus, the door 510 can receive the driving force from the lever-door link 550a so as to move. The door 510 may receive a driving force from the lever-door link 550a and move in the up-down direction and the front-rear direction.

The lever-door link 550a rotates about the lever-door link rotation axis x2 and the door 510 slides in the first direction or the second direction. Accordingly, in order to convert a rotational movement of the lever-door link 550a into a linear movement of the door 510, the door guide rail 552a should be formed to have a predetermined shape.

For example, the door guide rail 552a may have a bow-shaped curved groove shape which is convex in the forward direction.

For example, the door guide rail 552a may be formed in a curved shape which is curved rearward from a lower side to an upper side.

For example, the door guide rail 552a may have a shape obtained by quartering a donut, that is, a shape of a portion of a quadrant.

The door guide rail 552a may be formed to be positioned at one end of the door guide rail 552a when the first door pin 511a is positioned at a front end of the third guide rail front end 432a of the third guide rail 430a.

The door guide rail 552a may be formed to be positioned at the other end of the door guide rail 552a when the first door pin 511a is positioned at a rear end of the third guide rail rear end 431a of the third guide rail 430a.

Accordingly, when the lever-door link 550a rotates about the lever-door link rotation shaft x2, the driving force transferred from the lever 530a is transferred to the door 510, and thus, the door 510 can be opened and closed smoothly.

Referring to FIGS. 8 and 9, the lever-door link 550a may include the lever-door link through-hole 553a which is formed to be connected to the left cam plate 400a and the shaft sink 555.

The lever-door link through-hole 553a may be formed to pass through the lever-door link protrusion 554a protruding in the direction in which the combiner 210 is disposed.

The lever-door link connection boss 461a of the left cam plate 400a is inserted into one end of the lever-door link through-hole 553a, and thus, the left cam plate 400a and the lever-door link 550a can be connected to each other.

The shaft sink 555 is inserted into the other end of the lever-door link through-hole 553a, and thus, the pair of lever-door links 550a and 550b can be connected to be synchronized with each other. The synchronization of the pair of lever-door links 550a and 550b may be understood to mean that the pair of lever-door links 550a and 550b rotate at the same angular velocity.

Referring to FIG. 8, the pair of lever-door links 550a and 550b may be connected to each other by the shaft sink 555.

The shaft sink 555 may have a rod shape extending right and left. One of the shaft sink 555 is connected to the left lever-door link 550a, the other end thereof is connected to the right lever-door link 550b, and thus, the pair of lever-door links 550a and 550b can be connected so as to be synchronized with each other.

The pair of lever-door links 550a and 550b are connected to each other by the shaft sink 555 passing through the shaft sink through-holes 537a and 537b formed in the levers 530a and 530b, and thus, the pair of door links 550a and 550b can rotate at the same angular velocity.

Accordingly, the slot opening/closing device 500 is operated, the door 510 may receive the same driving force from both sides to be opened and closed smoothly without being biased to one side.

Referring to FIG. 8, the slot opening/closing device 500 may further include the elastic bodies 590a and 590b which provide an elastic force to open or close the door 510.

The elastic bodies 590a and 590b may include a pair of elastic bodies 590a and 590b from side to side.

For example, the elastic bodies 590a and 590b may be a spring.

One end of the left elastic body 590a may be connected to the first elastic body connect protrusion (471a of FIGS. 9 to 11) of the left cam plate 400a, and the other end thereof may be connected to the second elastic body connection protrusion (513a in FIGS. 11A and 11B) of the door 510.

Accordingly, the door 510 may be moved quickly when the door 510 is opened, or the door 510 may be closed to come into close contact with the housing 11 when the door 510 is closed.

The pair of lever-door links 550a and 550b may be provided laterally symmetrically with each other. Accordingly, the description of the left lever-door link 550a may be applied to the right lever-door link 550b.

Hereinafter, an operation of the slot opening/closing device 500 configured as described above will be described with reference to FIGS. 11A and 11B.

FIG. 11A shows an appearance when the left cam plate 400a shown in a translucent manner is viewed from an outside and shows a state where the combiner assembly 200 is located at the lowermost side and the door 510 is closed.

FIG. 11B shows an appearance when the left cam plate 400a shown in a translucent manner is viewed from the outside and shows a state where the combiner assembly 200 is raised by a predetermined height and the door 510 is opened.

First, a process of opening the door 510 will be described based on an appearance when the slot opening/closing device 500 viewed from the left side. Since the slot opening/closing device 500 may be formed to be symmetrical laterally, an appearance seen from the right side may be understood through the following description.

Referring to FIG. 11A, in a state where the combiner assembly 200 is located at the lowermost side, the lifting module boss 255a of the lifting module 250 may be positioned at the lowermost side of the lever guide rail 531a. That is, the lifting module boss 255a may be located at the lever guide rail lower end portion 533a.

The driving force is provided from the driver 300 to the lifting module 250, and when the lifting module 250 is raised, the lifting module boss 255a is raised along the lever guide rail 531a.

In this case, in the holder 230 connected to the lifting module 250, the first pin 232a of the combiner movement boss 231a is raised along the first guide rail 410a, and the second pin 233a is raised along the second guide rail 420a.

Meanwhile, when the lifting module boss 255a of the lifting module 250 moves, the lever 530a rotates in the direction in which the lower end of the lever 530a moves forward due to the curved shape of the lever guide rail 531a.

That is, the lifting module boss 255a located at A1 of FIG. 11A moves to A2 of FIG. 11B, and thus, the lever 530a is rotated in the clockwise direction about the lever rotation axis x1.

As the lever 530a rotates, the lever boss 535a rotates in a state where the lever boss 535a is engaged with the lever link groove 551a. Accordingly, the lever-door link 550a receives the driving force from the lever 530a, and thus, may rotate in the clockwise direction based on the lever-door link rotation axis x2.

As the lever-door link 550a rotates, the door guide rail 552a rotates in a state where the door guide rail 552a is engaged with the first door pin 511a. Accordingly, the door 510 receives the driving force from the lever-door link so as to move.

The door 510 receives the driving force from the lever-door link 550a through the first door pin 511a to move rearward and downward, and thus, the door 510 can open the slit.

The door 510 moves in a state where the first door pin 511a is inserted into the first guide rail 410a and the second door pin 512a is inserted into the second guide rail 420a, and thus, the movement direction of the door may be guided.

The movement direction of the door 510 may be guided by the first guide rail 410a and the second guide rail 420a, and may move further in a second direction upwards than a fourth direction after moving a predetermined distance in the fourth direction. The fourth direction may be a direction toward the rear lower side.

A process of closing the door 510 may be reversed to the process of opening the door 510. The description in the process of opening the door 510 may be applied to the process of closing the door 510.

When the lifting module 250 is lowered and reaches the lever guide rail lower end portion 533a, the lever 530a is rotated in the direction in which the lower end of the lever 530a moves rearward due to the curvature of the lever guide rail lower end portion 533a. That is, as the lifting module 250 is lowered, the lever 530a rotates in the counterclockwise direction.

Accordingly, the lever-door link 550a receives driving force from the lever 530a and rotates in the counterclockwise direction based on the lever-door link rotation axis x2.

In addition, as the lever-door link 550a rotates in the counterclockwise direction, the door 510 moves the front lower side, and thus, the slit may be closed.

The slot opening/closing device configured as described above can move the combiner up and down by a driving force generated by a single motor and can move the door, and thus, the head-up display apparatus 100 can be compactly configured.

In addition, compared to a case of moving the combiner and opening and closing the door using a plurality of motors, power consumption can be reduced, and problems such as noise and vibration caused when the motor is driven can also be reduced.

In addition, the slot opening/closing device is synchronized with the exposure or hiddenness of the combiner, and thus, a structure in which the door is quickly opened or closed can be provided. That is, while the combiner moves by a short distance relative to the entire movement length, the closed door is configured to be fully opened. Accordingly, the head-up display apparatus 100 is effectively operated, the door is operated quickly even when a user sees the door, and thus, aesthetics can be enhanced.

Figure 13:
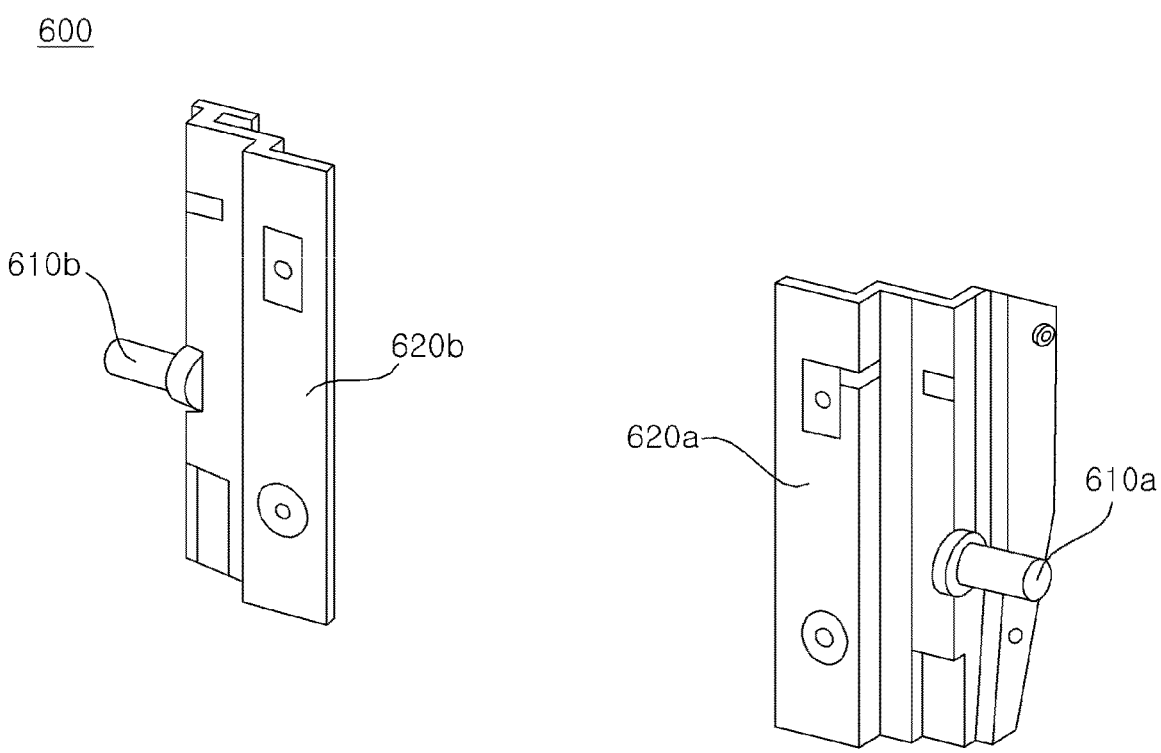
FIG. 13 is a view for explaining a cover gear according to an embodiment of the present disclosure.

FIG. 13 is a view for explaining a cover gear according to an embodiment of the present disclosure.

Referring to 3A, 3B, and 13, the cover gears 600a and 600b may include a pair of left and right cover gears 600a and 600b.

Hereinafter, the cover gears 600a and 600b will be described based on the left cover gear 600a.

The left cover gear 600a may include a cover gear boss 610a protruding toward the cam plate 400a.

The cover gear boss 610a may be inserted into the lever connection groove (451a of FIG. 9) of the cam plate 400a to allow the cam plate 400a, the lever 530a, and the cover gear 600a to be connected to each other.

The cover gear boss 610a passes through a lever through-hole 534a of the lever 530a, and the lever 530a may be rotatably connected to the cover gear boss 610a.

A protrusion length of the cover gear boss 610a is determined in consideration of a thickness of the lever 530a and a depth of the lever connection groove 451a of the left cam plate 400a.

The left cover gear 600a may include a bracket connection portion 620a which comes into contact with the bracket 700.

The bracket connection portion 620a may form a contact surface with the bracket 700 and may be connected to the bracket 700.

The bracket connection portion 620a may include one or more fasteners.

The cover gear 600a may be formed to correspond to inner shapes of the left cam plates 400a and 400b, and thus, a connection force between the left cam plate 400a and the cover gear 600a may be improved.

The cover gear 600a may support the left lever 530a and the left lever-door link 550a toward the left cam plate 400a such that the left lever 530a and the left lever-door link 550a are firmly connected to the left cam plate 400a.

The cover gear 600a connects the left cam plate 400a and the bracket 700, and thus, may fix a position of the bracket 700 based on the cam plate 400a.

The right cover gear 600b may be provided laterally symmetrically with the left cover gear 600a. Accordingly, the above description of the left gear cover 600a may be applied to the right cover gear 400b.

Figure 14:
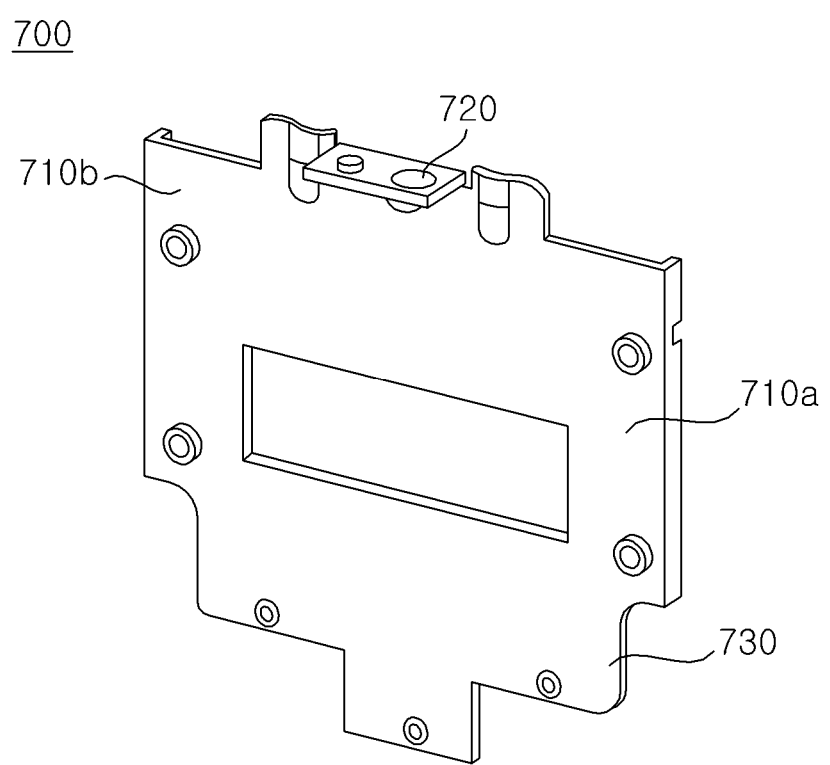
FIG. 14 is a view for explaining a bracket according to an embodiment of the present disclosure.

FIG. 14 is a view for explaining a bracket according to an embodiment of the present disclosure.

The bracket 700 may include a connection portion which is connected to the cover gears 600a and 600b and the driver 300.

A bracket left connection portion 710a may be connected to the bracket connection portion 620a of the left cover gear 600a.

A bracket right connection portion 710b may be connected to the bracket connection portion 620b of the right cover gear 600b.

A bracket upper connection portion 720 protrudes toward the combiner 210 and may be connected to the driving shaft 320 and the guide shaft 330 of the driver 300. The driving shaft 320 may be rotatably connected to the bracket upper connection portion 720.

The bracket lower connection portion 730 may be connected to the drive 300. A contact surface of the bracket lower connection portion 730 may be formed so as to correspond to the shape of the driver 300.

The bracket 700 may connect the drive 300 such that the position of the driver 300 is fixed based on the cam plates 400a and 400b.

The effects of the present disclosure are not limited to the effects mentioned above, and other effects not mentioned will be clearly understood by those skilled in the art from claims.

What is claimed is:

1. A head-up display apparatus for a vehicle, the apparatus comprising:
   a combiner assembly which includes a combiner exposed outside a dashboard or hidden inside the dashboard through a slot formed in the dashboard;
   a driver which provides a driving force to the combiner assembly; and
   a slot opening/closing device which opens or closes the slot by the driving force of the driver,
   wherein the slot opening/closing device includes
   a door which opens or closes the slot,
   a lever-door link of which one end is connected to the door and which rotates about a first rotation axis, and
   a lever of which one end is connected to the lever-door link, which rotates about a second rotation axis, and to which the combiner assembly is slidably connected.

2. The apparatus of claim 1, wherein the combiner assembly includes a lifting module of which one end is connected to the lever, and
   the lever rotates about a lever rotation axis formed closer to the lifting module than the door, in a state where the combiner is hidden.

3. The apparatus of claim 2, wherein the lever includes a lever guide rail into which a lifting module boss formed in the lifting module is inserted so as to move, and
   one end of the lever guide rail at which the lifting module is located in the state where the combiner is hidden has a shape which is curved in one direction.

4. The apparatus of claim 1, wherein the lever-door link rotates about the first rotation axis disposed closer to the door than the second rotation axis.

5. The apparatus of claim 4, wherein in the lever-door link, at least a portion of the lever-door link is disposed to overlap the lever such that a virtual line extending from the first rotation axis passes through the lever.

6. The apparatus of claim 5, wherein in the lever-door link, a lever link groove into which a lever boss provided in the lever is inserted so as to move is disposed between a connection portion between the lever-door link and the door, and the first rotation axis.

7. The apparatus of claim 6, wherein the door includes a first door pin which is inserted into a door guide rail provided in the lever-door link and moves an up-down direction and a front-rear direction.

8. The apparatus of claim 7, wherein a pair of the lever-door links is respectively disposed on both sides of the combiner assembly, and
the pair of lever-door links is connected to each other by a shaft sink passing through a through-hole formed in the lever and the pair of lever-door links rotates at the same angular velocity.

9. The apparatus of claim 7, wherein when the lever rotates in one direction about the first rotation axis, the lever-door link rotates in the one direction about the second rotation axis such that the door is opened.

10. The apparatus of claim 7, further comprising:
a cam plate which covers the combiner assembly and the slot opening/closing device from one side,
wherein the cam plate includes a door guide rail into which a second guide boss provided in the door is inserted so as to move.

\* \* \* \* \*